United States Patent
Corcoran et al.

(10) Patent No.: US 8,015,390 B1
(45) Date of Patent: Sep. 6, 2011

(54) DISSIMILAR PROCESSOR SYNCHRONIZATION IN FLY-BY-WIRE HIGH INTEGRITY COMPUTING PLATFORMS AND DISPLAYS

(75) Inventors: James J. Corcoran, Cedar Rapids, IA (US); Eric J. Danielson, Iowa City, IA (US); Samir S. Hemaidan, Cedar Rapids, IA (US); John W. Roltgen, Cedar Rapids, IA (US); James E. Sisson, Robins, IA (US); Mark A. Kovalan, Cedar Rapids, IA (US); Mark C. Singer, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 623 days.

(21) Appl. No.: 12/077,599

(22) Filed: Mar. 19, 2008

(51) Int. Cl.
*G06F 11/00* (2006.01)
(52) U.S. Cl. .......................................... 712/12
(58) Field of Classification Search .................. 714/10, 714/11, 12; 701/3
See application file for complete search history.

(56) References Cited

U.S. PATENT DOCUMENTS

| | | | |
|---|---|---|---|
| 3,810,119 A * | 5/1974 | Zieve et al. ................... 713/375 |
| 4,622,667 A | 11/1986 | Yount | |
| 4,799,159 A | 1/1989 | Davidson et al. | |
| 4,890,284 A * | 12/1989 | Murphy et al. ................. 714/11 |
| 5,113,522 A | 5/1992 | Dinwiddie, Jr. et al. | |
| 5,325,517 A | 6/1994 | Baker et al. | |
| 5,423,024 A * | 6/1995 | Cheung ........................... 714/11 |
| 5,572,620 A * | 11/1996 | Reilly et al. .................... 714/11 |
| 6,434,712 B1 * | 8/2002 | Urban et al. .................... 714/12 |
| 6,469,654 B1 | 10/2002 | Winner et al. | |
| 6,772,368 B2 * | 8/2004 | Dhong et al. ................... 714/11 |
| 6,883,121 B1 | 4/2005 | Jensen et al. | |
| 6,928,583 B2 * | 8/2005 | Griffin et al. ................... 714/11 |
| 7,024,594 B2 * | 4/2006 | Pignol ............................. 714/54 |
| 7,055,060 B2 * | 5/2006 | Nguyen et al. .................. 714/11 |
| 7,209,809 B2 * | 4/2007 | Yeh .................................. 701/3 |
| 7,340,643 B2 * | 3/2008 | Grochowski et al. ........... 714/11 |
| 7,725,215 B2 * | 5/2010 | Stange et al. ..................... 701/1 |
| 7,793,147 B2 * | 9/2010 | Stange et al. ................... 714/13 |
| 2002/0152418 A1 * | 10/2002 | Griffin et al. ................... 714/11 |
| 2002/0152419 A1 * | 10/2002 | McLoughlin et al. .......... 714/11 |
| 2005/0085957 A1 | 4/2005 | Yeh | |
| 2006/0100750 A1 * | 5/2006 | Platzer et al. .................... 701/3 |
| 2007/0083301 A1 | 4/2007 | Yeh | |
| 2007/0109745 A1 | 5/2007 | Yeh | |
| 2007/0300231 A1 | 12/2007 | Aguilar et al. | |

* cited by examiner

*Primary Examiner* — Amine Riad
(74) *Attorney, Agent, or Firm* — Daniel M. Barbieri

(57) ABSTRACT

A flight control system includes an output device, a first processor, and a second processor. The second processor is dissimilar to the first processor. The flight control system also includes a first arbitration device coupled to the first processor and a second arbitration device coupled to the second processor. The second arbitration device is configured to coordinate transaction synchronization with the first arbitration device and the first arbitration device is configured to coordinate transaction synchronization with the second arbitration device. A comparator processor is coupled to the first arbitration device and the second arbitration device. The comparator processor is configured to compare transaction synchronized outputs of the first and second processors and the comparator processor effectuates a command to the output device if the comparison is valid.

20 Claims, 3 Drawing Sheets

DISSIMILAR PROCESSOR SYNCHRONIZATION IN FLY-BY-WIRE HIGH INTEGRITY COMPUTING PLATFORMS AND DISPLAYS

BACKGROUND

As the integrity of flight deck and auto flight platforms for aircraft increases, e.g. 10 to the minus 10, the requirement to synchronize dissimilar processors becomes necessary. Also, it may be advantageous to conserve space and minimize equipment to utilize dissimilar processors to reduce the number of redundant processors conventionally being used. This may be reflected in both in the number of Line Replaceable Units (LRU's) utilized and the number of processors used. In fly-by-wire applications, it is important to maintain the ability to provide the comparison of the information for input/output data flow with the correct bit-by-bit review and thereby determine the integrity of the processing platform and the application requirements for the aircraft control. In other situations the use of dissimilar processors may also prove to be advantageous as compared with conventional systems. For example, it may be advantageous to use dissimilar processors in achieving display requirements for the Engine Indication and Crew Alerting System (EICAS) control of circuit breakers.

Accordingly, there is a need for systems and methods of providing dissimilar processors and making comparisons of the output of those dissimilar processors to provide integrity monitoring and integrity control.

The techniques herein below extend to those embodiments which fall within the scope of the appended claims, regardless of whether they accomplish one or more of the above-mentioned needs.

SUMMARY

An exemplary embodiment relates to a flight control system. The flight control system includes an output device. The flight control system also includes a first processor and a second processor. The second processor is dissimilar to the first processor. The flight control system also includes a first arbitration device coupled to the first processor and a second arbitration device coupled to the second processor. The second arbitration device is configured to coordinate transaction synchronization with the first arbitration device and the first arbitration device is configured to coordinate transaction synchronization with the second arbitration device. A comparator processor is coupled to the first arbitration device and the second arbitration device. The comparator processor is configured to compare transaction synchronized outputs of the first and second processors and the comparator processor effectuates a command to the output device if the comparison is valid.

Another exemplary embodiment relates to a method of comparing output information from dissimilar processors. The method includes receiving a task by a first processor. The method also includes receiving the task by a second processor. The second processor is dissimilar to the first processor. Further, the method includes computing a first output by the first processor based on the task and computing a second output by the second processor based on the task. Further still, the method includes transaction synchronizing the first and second outputs by the first and second arbitration devices. Yet further still, the method includes comparing by a comparator processor the transaction synchronized outputs of the first and second processors.

Further an exemplary embodiment relates to a processing system. The processing system includes an output device, a first processor, and, a second processor. The second processor is dissimilar to the first processor. The processing system also includes a first arbitration device coupled to the first processor. The processing system further includes a second arbitration device coupled to the second processor. The second arbitration device is configured to coordinate transaction synchronization with the first arbitration device and the first arbitration device is configured to coordinate transaction synchronization with the second arbitration device. A comparator program receives information from the first arbitration device and the second arbitration device. The comparator program is configured to compare transaction synchronized outputs of the first and second processors.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
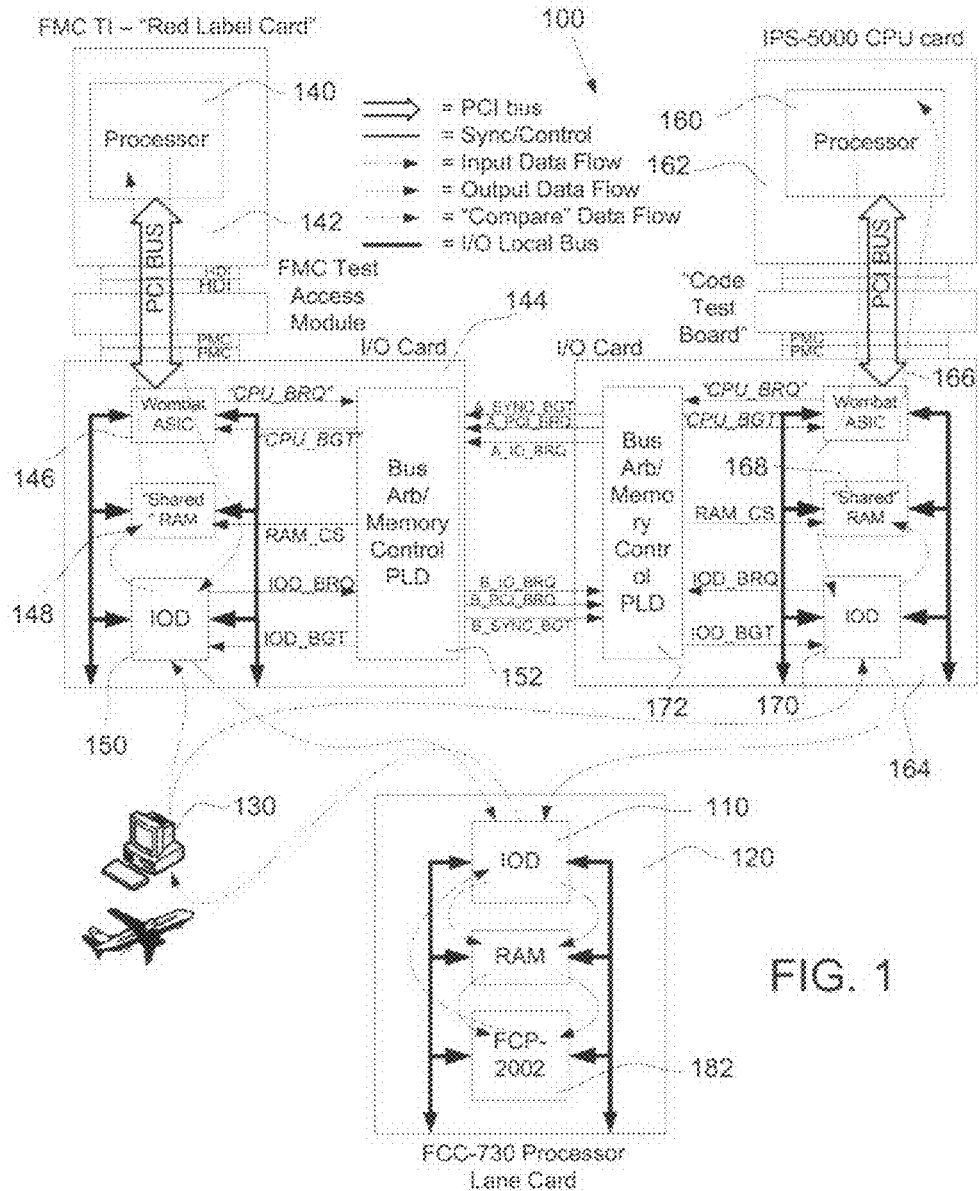
FIG. 1 is an exemplary block diagram of a flight control application in accordance with an exemplary embodiment.
Figure 2:
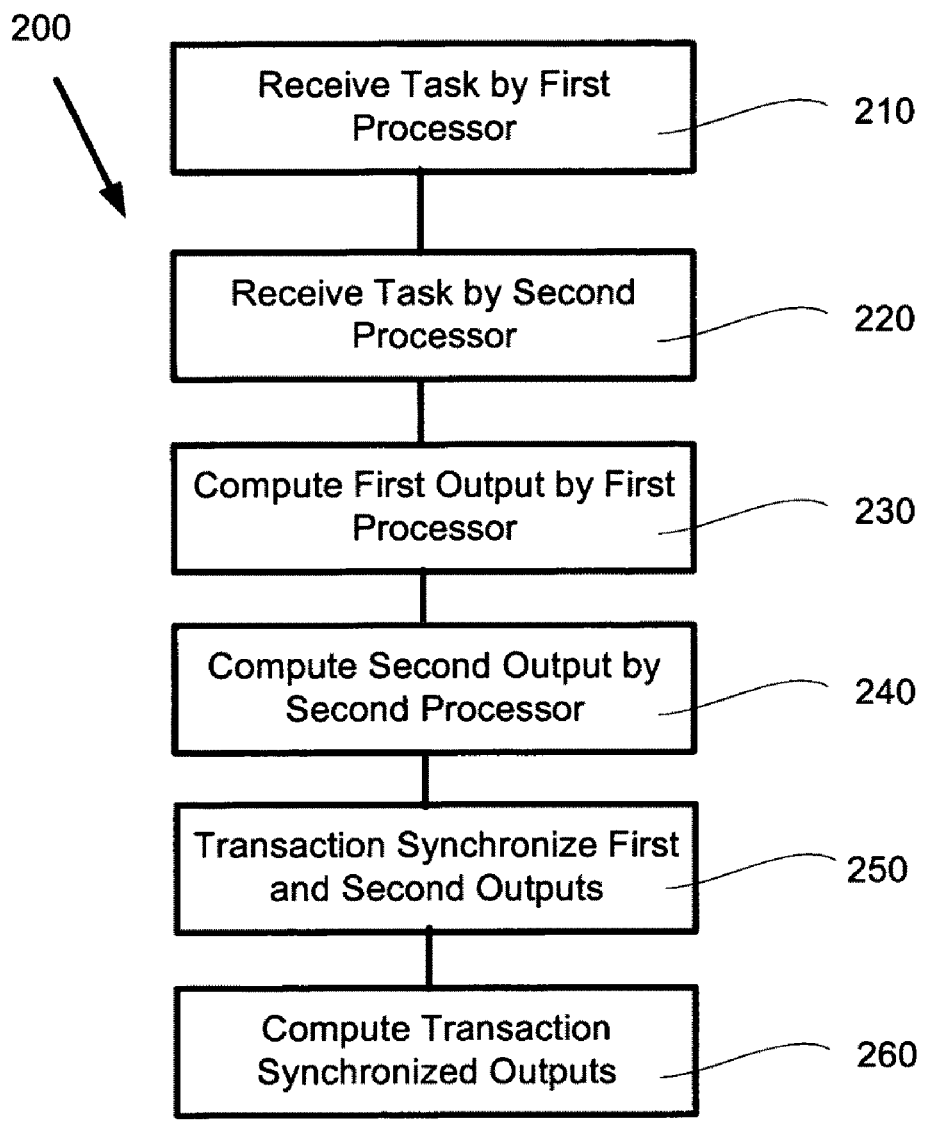
FIG. 2 is an exemplary process diagram of a transaction synchronization process in accordance with an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In fly-by-wire applications two major concerns are important to the certification and reliability of such a system. These concerns include integrity, i.e., in the system configured to be relatively fail-safe or fail-operative; and availability, i.e., if one device fails the aircraft can still be controlled. Typically in conventional systems redundant systems may be used which have the same processors. However, such systems have the disadvantage that the failure may be the same in the same processors. Thus, in such systems, multiple redundant systems may be used to help maintain reliability. Because of the disadvantages and shortcomings of conventional redundant processor systems, it may be advantageous to utilize redundant processors such that the redundant processors are dissimilar, that is having different clock speeds, different register sizes, different architectures, etc. However, to maintain such a system requires synchronization of the two dissimilar processors.

In accordance with an exemplary embodiment, this synchronization can be implemented in a flight control system 100 of FIG. 1. Flight control system 100 includes an input/output device 110 which may be coupled to a comparator processor card 120. Input/output device 110 includes a connection (wired or wireless) to a device which may be a computer 130, an actuator, a display, a flight management system, or the like, diagrammatically represented here generally as computer 130.

A first processor 140 may be part of a card 142 and coupled to an I/O card 144. I/O card 144 may include an ASIC or other processor 146, a shared RAM 148, and an input/output device (IOD) 150. Each of these may be coupled to an arbitration device 152. Similarly, a second processor, the second processor 150 may be dissimilar to first processor 140. Such dissimilarity may be in clock speed, processor architecture, register size, etc. Second processor 160 may also be coupled to a card 162 and further electrically coupled to an arbitration card 164. Second arbitration card 164 may include an ASIC or other processor 166, a shared memory 168, an input/output device 170 and an arbitration device 172.

The second arbitration device 164 is configured to coordinate transaction synchronization with the first arbitration device and the first arbitration device is configured to coordinate transaction synchronization with the second arbitration device.

Comparator processor card 120 may be coupled to the first arbitration card 144 and the second arbitration card 174. Comparator processor card 120 may be being configured to compare transaction synchronized outputs of the first and second processors and a comparator processor 182 may effectuate a command to the output device if the comparison is valid. However, if the comparison is not valid, various actions may be taken including but not limited to requesting the task again, shutting down operation of or communication with the processors, or providing operational alerts or warnings.

In accordance with an exemplary embodiment, the system 100 may be applied in various applications including but not limited to flight control applications where the processor output is used to effectuate movement of an actuator for an aircraft. Further, system 100 may be applied such that the output is used for communication with a display device, a traffic collision avoidance system (TCAS), an enhanced ground proximity warning system (EGPWS) or the like.

In accordance with an exemplary embodiment, the processors may be dissimilar in various ways including but not limited to the first processor and the second processor running at different clock speeds, or the first processor and the second processor having different processor architectures. Also, in accordance with an exemplary embodiment, the first arbitration device and the second arbitration device may be programmable logic devices (PLDs).

Exemplary embodiments also relate to methods of comparing output information from dissimilar processors using systems like system 100. These methods 200 include receiving a task by a first processor (process 210) receiving the task by a second processor (process 220). The second processor, as discussed above is dissimilar to the first processor.

A first output is computed by the first processor based on the task (process 230). A second output by the second processor is computed based on the task (process 240). The first and second outputs by the first and second arbitration devices are transaction synchronized (process 250) such that outputs corresponding to the same task are delivered virtually simultaneously to the comparator processor. The comparator processor then compares the transaction synchronized outputs of the first and second processors (process 260).

In accordance with an exemplary embodiment, the process may also include indicating by the comparator processor a result of the comparison. The result may be in the form of a valid or invalid indication or may provide an error between the outputs. If the comparison is valid or the error is within a predetermined range, the output may be provided to the output receiving device which may be an actuator, a display device, a flight computer, etc.

Figure 3:
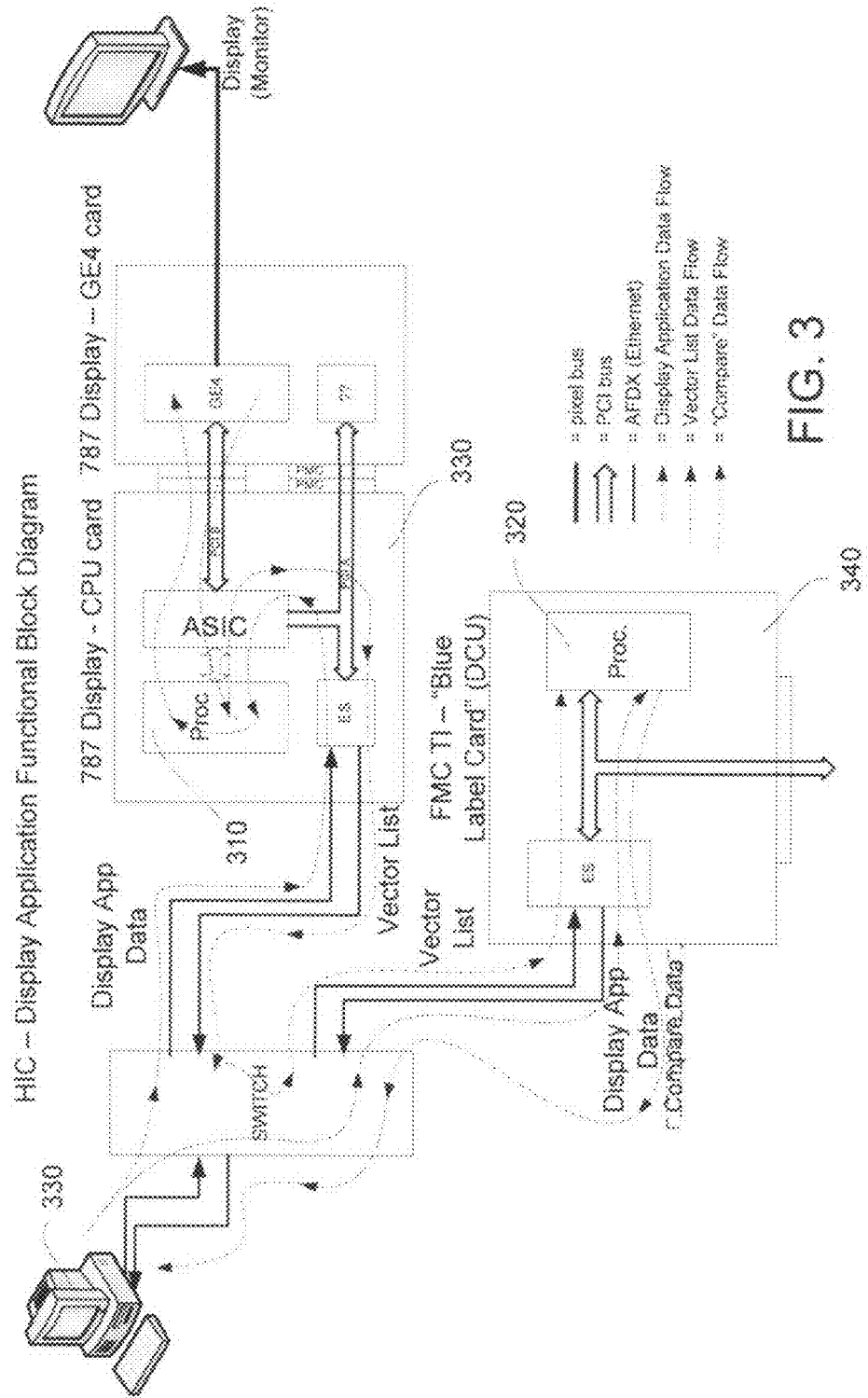
FIG. 3 is an exemplary diagram of a display system in accordance with an exemplary embodiment.

In accordance with another exemplary embodiment, the transaction synchronized comparison system may be applied to a display system 300 as illustratively depicted in FIG. 3. Display system 300 uses two dissimilar processors 310 and 320. Computer 330 is representative of the device on which the display application software resides. As tasks are requested, a vector list is generated by processor 310 and associated hardware. The vector list is delivered to processor 320. In one exemplary embodiment, processor 320 both computes its own version of the vector list to compare with the vector list from processor 310 and compares the two vector lists. In another exemplary embodiment the comparison may be carried out on a separate processor. Transaction synchronization is carried out on each of cards 330 and 340 in a manner similar to that described with regard to FIG. 1. In accordance with an exemplary embodiment, the architecture depicted in FIG. 3 is not only applicable to display systems, but may be applied to other systems including actuator systems, flight control systems, etc.

One of the plurality of benefits achieved by the transaction synchronization system is help in minimizing the amount of equipment needed. For example, the systems described may be implemented on a smaller number of line replaceable units (LRU's) than for conventional systems.

While the detailed drawings, specific examples, and particular formulations given described exemplary embodiments, they serve the purpose of illustration only. It should be understood that various alternatives to the embodiments of the invention described may be employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. A flight control system, comprising:
    an output device;
    a first processor;
    a second processor, the second processor being dissimilar to the first processor;
    a first arbitration device coupled to the first processor;
    a second arbitration device coupled to the second processor, the second arbitration device configured to coordinate transaction synchronization with the first arbitration device and the first arbitration device configured to coordinate transaction synchronization with the second arbitration device; and a comparator processor coupled to the first arbitration device and the second arbitration device, the comparator processor being configured to:
compare transaction synchronized outputs of the first and second processors; and
transmit a command to the output device according to the comparison.

2. The flight control system of claim 1, wherein the output device includes an actuator for an aircraft.

3. The flight control system of claim 1, wherein the output device includes a display device for an aircraft.

4. The flight control system of claim 1, wherein the first processor and the second processor run at different clock speeds.

5. The flight control system of claim 1, wherein the first processor and the second processor include different processor architectures.

6. The flight control system of claim 1, wherein the first arbitration device and the second arbitration device include programmable logic devices (PLDs).

7. A method of comparing output information from dissimilar processors, comprising:
receiving a task by a first processor;
receiving the task by a second processor, the second processor being dissimilar to the first processor;
computing a first output by the first processor based on the task;
computing a second output by the second processor based on the task;
transaction synchronizing the first and second outputs by the first and second arbitration devices; and
comparing by a comparator processor the transaction synchronized outputs of the first and second processors.

8. The method of claim 7, further comprising:
indicating by the comparator processor a result of the comparison.

9. The method of claim 7, further comprising:
indicating by the comparator processor a result of the comparison, the result being whether the comparison between the first and second outputs is valid or invalid.

10. The method of claim 7, further comprising:
indicating by the comparator processor a result of the comparison; outputting at least one of the first or second outputs in response to the result.

11. The method of claim 7, further comprising:
indicating by the comparator processor a result of the comparison; and
outputting at least one of the first or second outputs in response to the result, the output being provided to at least one actuator.

12. The method of claim 7, further comprising:
indicating by the comparator processor a result of the comparison; and
outputting at least one of the first or second outputs in response to the result, the output being provided to at least one display device.

13. The method of claim 7, wherein the dissimilar processors are part of a flight control system.

14. The method of claim 7, wherein the dissimilar processors are part of a display system.

15. A processing system, comprising:
an output device;
a first processor;
a second processor, the second processor being dissimilar to the first processor;
a first arbitration device coupled to the first processor;
a second arbitration device coupled to the second processor, the second arbitration device configured to coordinate transaction synchronization with the first arbitration device and the first arbitration device configured to coordinate transaction synchronization with the second arbitration device; and
a comparator program receiving information from the first arbitration device and the second arbitration device, the comparator program being configured to compare transaction synchronized outputs of the first and second processors.

16. The processing system of claim 15, wherein the comparator program is running on one of the first or second processors.

17. The processing system of claim 15, wherein the output device includes an actuator.

18. The processing system of claim 15, wherein the output device includes a display.

19. The processing system of claim 15, wherein the first processor and the second processor run at different clock speeds.

20. The processing system of claim 15, wherein the first processor and the second processor include different processor architectures.

* * * * *